US 8,805,755 B2

(12) United States Patent
Risvik et al.

(10) Patent No.: US 8,805,755 B2
(45) Date of Patent: Aug. 12, 2014

(54) DECOMPOSABLE RANKING FOR EFFICIENT PRECOMPUTING

(71) Applicant: Microsoft Corporation, Redmond, WA (US)

(72) Inventors: Knut Magne Risvik, Mo I Rana (NO); Michael Hopcroft, Kirkland, WA (US); John G. Bennett, Bellevue, WA (US); Karthik Kalyanaraman, Bellevue, WA (US); Trishul Chilimbi, Seattle, WA (US); Vishesh Parikh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/932,866

(22) Filed: Jul. 1, 2013

(65) Prior Publication Data

US 2013/0297621 A1 Nov. 7, 2013

Related U.S. Application Data

(63) Continuation of application No. 12/951,659, filed on Nov. 22, 2010, now Pat. No. 8,478,704.

(51) Int. Cl.
*G06F 15/18* (2006.01)
(52) U.S. Cl.
USPC .......................................... 706/12
(58) Field of Classification Search
USPC ............................... 706/12, 45, 62
See application file for complete search history.

(56) References Cited

U.S. PATENT DOCUMENTS

| 8,010,482 | B2* | 8/2011 | Andersen et al. ............... 706/62 |
| 8,527,523 | B1* | 9/2013 | Ravid ............................ 707/749 |
| 2003/0217052 | A1* | 11/2003 | Rubenczyk et al. ............. 707/3 |
| 2011/0093459 | A1* | 4/2011 | Dong et al. ................... 707/725 |
| 2011/0191310 | A1* | 8/2011 | Liao et al. ..................... 707/706 |

FOREIGN PATENT DOCUMENTS

| CH | CN 1517914 | 8/2004 |
| CN | 1670723 | 9/2005 |
| CN | 1728143 | 2/2006 |
| CN | 101322125 | 12/2008 |
| CN | 101583945 | 11/2009 |

* cited by examiner

*Primary Examiner* — David Vincent
(74) *Attorney, Agent, or Firm* — Dave Ream; Peter Taylor; Micky Minhas

(57) ABSTRACT

Methods and computer storage media are provided for generating an algorithm used to provide preliminary rankings to candidate documents. A final ranking function that provides final rankings for documents is analyzed to identify potential preliminary ranking features, such as static ranking features that are query independent and dynamic atom-isolated components that are related to a single atom. Preliminary ranking features are selected from the potential preliminary ranking features based on many factors. Using these selected features, an algorithm is generated to provide a preliminary ranking to the candidate documents before the most relevant documents are passed to the final ranking stage.

20 Claims, 4 Drawing Sheets

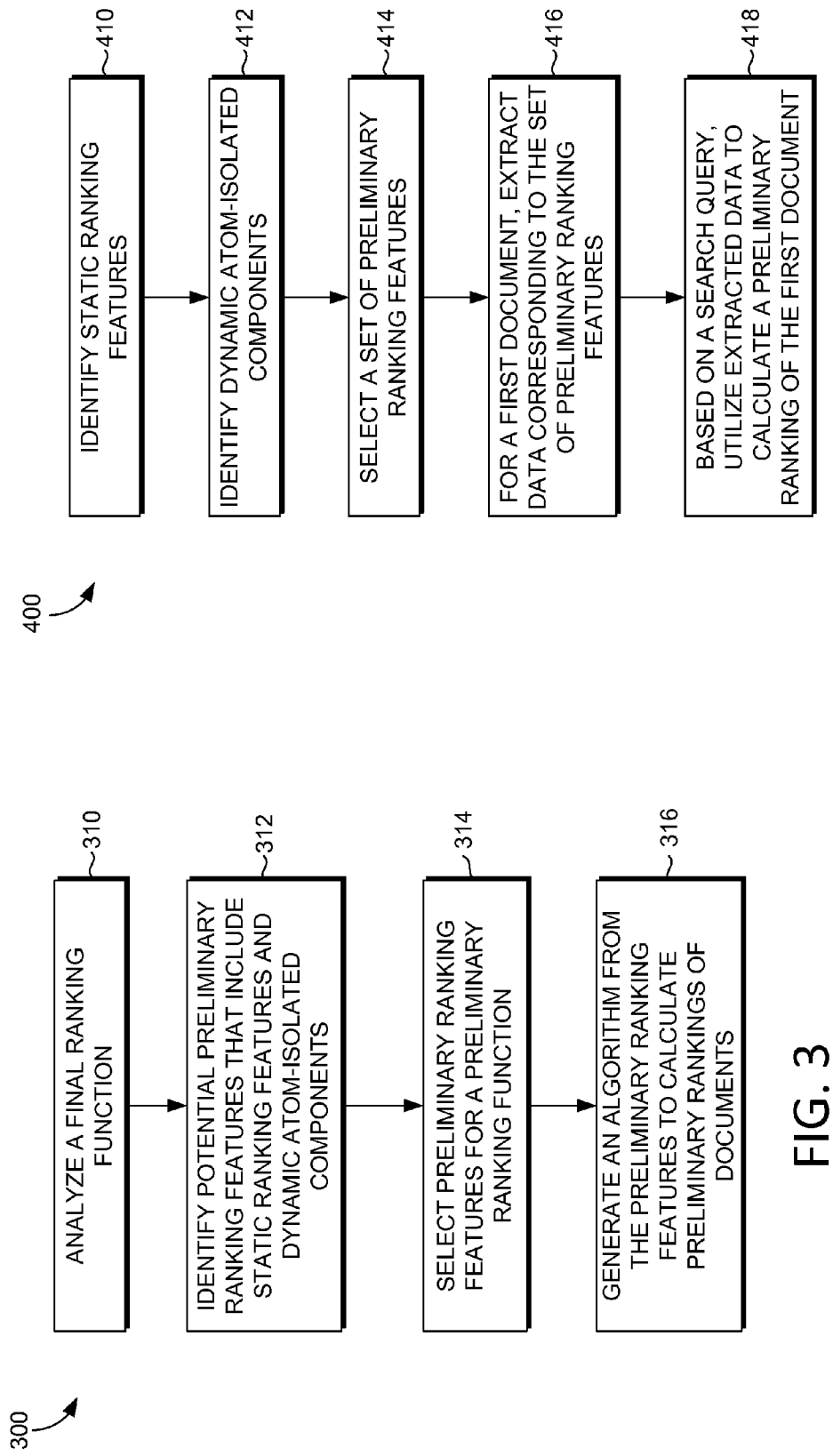

DECOMPOSABLE RANKING FOR EFFICIENT PRECOMPUTING

CROSS-REFERENCE TO RELATED APPLICATIONS

This application is a continuation of, and claims priority from, U.S. patent application Ser. No. 12/951,659, filed Nov. 22, 2010, entitled "DECOMPOSABLE RANKING FOR EFFICIENT PRECOMPUTING," which is incorporated herein by reference in its entirety.

BACKGROUND

The amount of information and content available on the Internet continues to grow very fast. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Search engines operate by crawling documents and indexing information regarding the documents in a search index. When a search query is received, the search engine employs the search index to identify documents relevant to the search query. For instance, a ranking function may be employed to determine the most relevant documents to present to a user based on a search query. Ranking functions, however, have become increasingly complex such that hundreds of features are used to rank documents. Complex ranking functions, when used alone, are ineffective because of cost and time constraints.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to the generation of algorithms used in conjunction with a preliminary ranking stage of an overall ranking process. As further described below, the overall ranking process may include a matching stage, a preliminary ranking stage, and a final ranking stage. Hundreds of millions or even trillions of documents may be indexed. Because the final ranking function is generally more expensive and time-consuming than the preliminary ranking function, the matching stage and the preliminary ranking stage function to limit the number of candidate documents that the final ranking function has to rank. Generally, the preliminary ranking function used in the preliminary ranking stage is a simplified version of the final ranking function used in the final ranking stage. As such, the final ranking function is analyzed to identify ranking features that can be precomputed (e.g., document ranking features) or that are not easily computed in real-time after a query is received and the ranking features that are easily computed in real-time. Ranking features not used in the final ranking function may also be used in the preliminary ranking function. Once the algorithm is generated, it can be used to compute preliminary rankings for documents.

BRIEF DESCRIPTION OF THE DRAWINGS

The present invention is described in detail below with reference to the attached drawing figures, wherein:

FIG. 3 is a flow diagram showing a method for generating an algorithm used to provide preliminary rankings to a plurality of documents, in accordance with embodiments of the present invention;

FIG. 4 is a flow diagram showing a method for calculating a preliminary ranking for documents, in accordance with embodiments of the present invention.

DETAILED DESCRIPTION

Figure 1:
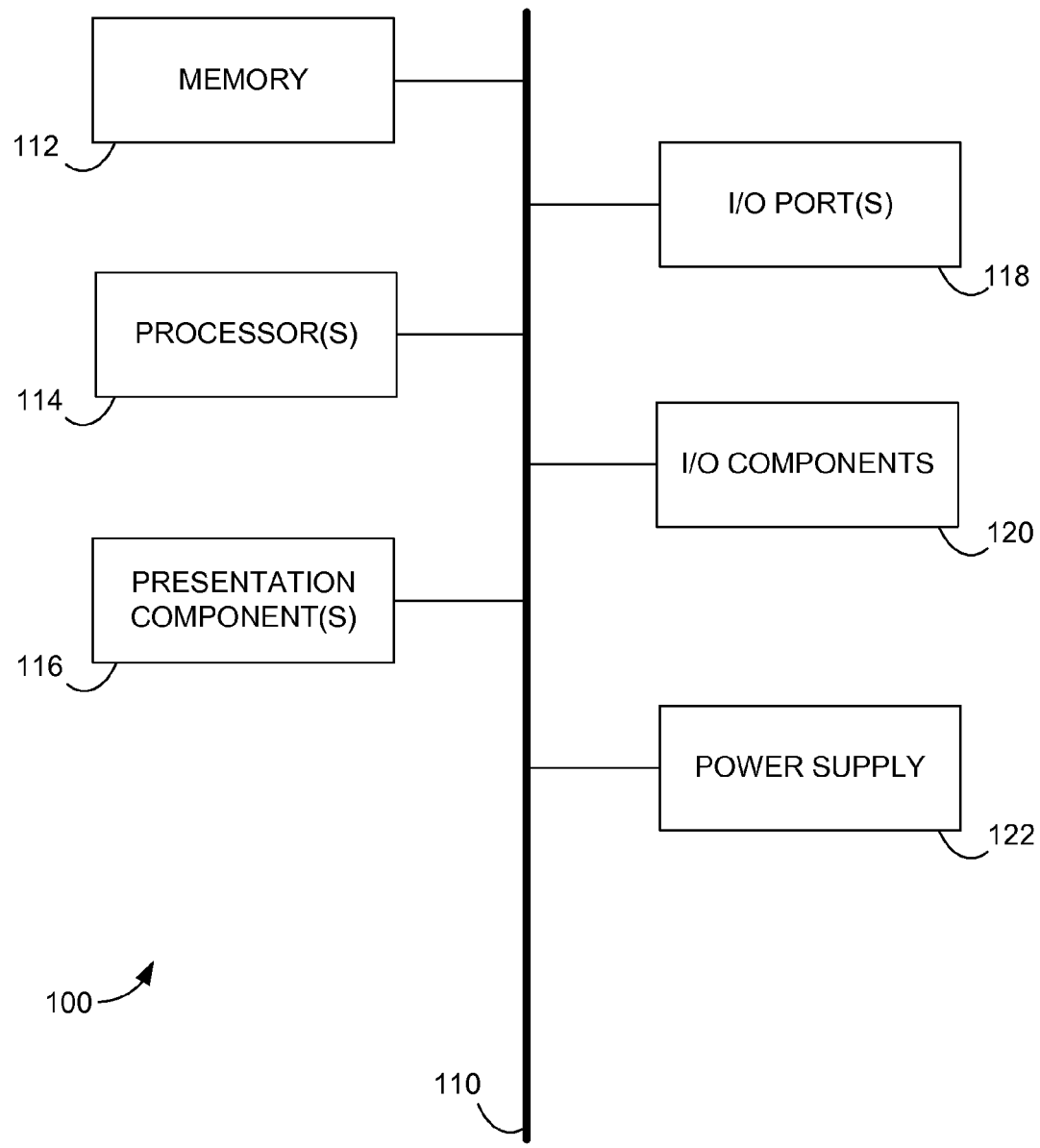
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide for generating algorithms used in a preliminary ranking stage of an overall ranking process. Embodiments also provide for using the algorithm to calculate preliminary rankings for documents such that the number of documents sent to the final ranking component is greatly reduced. As mentioned, the preliminary ranking function is generally a fast and low cost computation that is a useful estimate of the final ranking function. The preliminary ranking function can be trusted to identify a reduced set of relevant documents that are worthy of the more costly final ranking stage. As such, ranking features that can be precomputed (e.g., document ranking features) or that are not easily computed in real-time after a query is received, such as static features and dynamic atom-isolated components that may be used by the final ranking function are identified as potential ranking features for use by the preliminary ranking function. These identified ranking features include a combination of those that are easy to compute at query match time, those that are not easy to compute at query match time and that can be precomputed, those that are useful as measured by a metric of fidelity in estimating the final ranking, and those adaptive in terms of remaining useful even when the preliminary ranking function is modified. Precomputed scores for atom/document pairs are stored in a search index and are extracted during computation of preliminary rankings. The documents that are found to be most relevant are sent to the final ranking stage. Fidelity measurements are utilized to ensure that the final ranking function and the preliminary ranking function are similarly ranking documents to ensure fidelity and low error rates between the two ranking stages.

Accordingly, in one aspect, an embodiment of the present invention is directed to a method for generating an algorithm used to provide preliminary rankings to a plurality of documents. The method includes analyzing a final ranking function used to calculate final rankings for a plurality of documents. From the final ranking function, the method further includes identifying potential preliminary ranking features that include one or more static ranking features that are query independent and one or more dynamic atom-isolated components that are related to a single atom. Additionally, the method includes selecting from the potential preliminary ranking features one or more preliminary ranking features to use for a preliminary ranking function and using at least the one or more preliminary ranking features to generate an algorithm that is used to provide a preliminary ranking for the plurality of documents.

In another embodiment, an aspect of the invention is directed to a method for calculating a preliminary ranking for documents. The method includes identifying static ranking features that are query independent, and identifying dynamic atom-isolated components that are related to a single atom. Further, the method includes selecting a set of preliminary ranking features comprising one or more of the static ranking features and one or more of the dynamic atom-isolated components. For a first document, the method extracts data corresponding to the set of preliminary ranking features from a search index. Based on a search query, the method utilizes the extracted data to calculate a preliminary ranking of the first document.

A further embodiment of the invention is directed to one or more computer storage media storing computer-useable instructions that, when used by a computing device, cause the computing device to perform a method for utilizing ranking features from a final ranking stage in a preliminary ranking stage to determine preliminary rankings for documents. The method includes analyzing a final ranking function to identify a first subset of ranking features that includes query-independent ranking features and single atom ranking features and selecting a second subset of ranking features not used in the final ranking function. Further, the method includes, from the first subset and the second subset of ranking features, selecting one or more preliminary ranking features for use in calculating a preliminary ranking of a plurality of documents using a preliminary ranking function that limits a quantity of documents that are ranked using the final ranking function. Based at least on data associated with the first subset and the second subset of ranking features extracted from a search index, the method algorithmically identifies, using the preliminary ranking function, a subset of the plurality of documents. The method additionally includes communicating document identifications corresponding to the subset of the plurality of documents to a final ranking stage that uses the final ranking function to calculate final rankings of each document in the subset of the plurality of documents.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
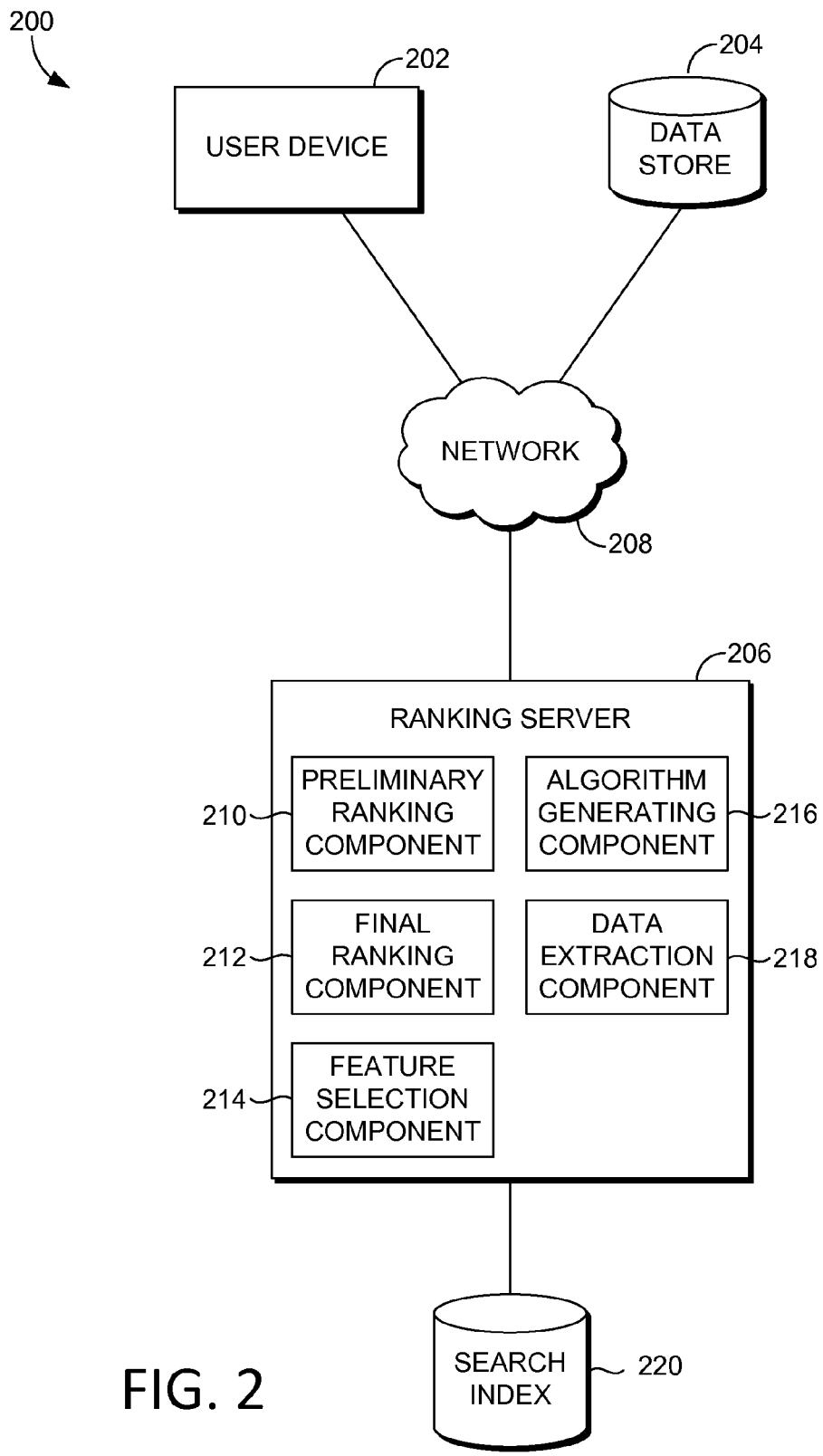
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, a data store 204, a ranking server 206, and a search index 220. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, ranking servers, ranking generators, data stores, and search indexes may be employed within the system 200 within the scope of the present invention. Each may comprise a single device or multiple devices cooperating in a distributed environment. For instance, the ranking server 206 may comprise multiple devices arranged in a distributed environment that collectively provide the functionality of the ranking server 206 described herein. Additionally, other components not shown may also be included within the system 200, while components shown in FIG. 2 may be omitted in some embodiments.

The search index 220 employed by embodiments of the present invention indexes higher order primitives or "atoms" from documents, as opposed to simply indexing single terms. As used herein, an "atom" may refer to a variety of units of a query or a document. These units may include, for example, a term, an n-gram, an n-tuple, a k-near n-tuple, etc. A term maps down to a single symbol or word as defined by the particular tokenizer technology being used. A term, in one embodiment is a single character. In another embodiment, a term is a single word or grouping of words. An n-gram is a sequence of "n" number of consecutive or almost consecutive terms that may be extracted from a document. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent or dependent) in a document. Further, a k-near n-tuple, as used herein, refers to a set of "n" terms that co-occur within a window of "k" terms in a document. Thus, an atom is generally defined as a generalization of all of the above. Implementations of embodiments of the present invention may use different varieties of atoms, but as used herein, atoms generally describes each of the above-described varieties.

The user device 202 may be any type of computing device owned and/or operated by an end user that can access network 208. For instance, the user device 202 may be a desktop computer, a laptop computer, a tablet computer, a mobile device, or any other device having network access. Generally, an end user may employ the user device 202 to, among other things, access electronic documents maintained by the system, such as the ranking server 206 or the like. For instance, the end user may employ a web browser on the user device 202 to access and view electronic documents from the ranking server 206. In other embodiments, documents are not stored on the ranking server 206, but may be stored in the data store 204.

The ranking server 206 is generally responsible for selecting ranking features to use for a preliminary ranking stage of an overall ranking process. Generally, the overall ranking process comprises two or more ranking stages, such as a preliminary ranking stage and a final ranking stage. In embodiments described herein, the preliminary ranking stage utilizes one or more of the ranking features used in the final ranking stage, such as those ranking features that do not have atom interdependencies. While the second ranking stage is termed the "final ranking stage" of the "final ranking process," there may be other ranking stages subsequent to this stage, and as such the use of the word "final" is not meant to imply that it is the last stage. For instance, the preliminary ranking stage may be a first ranking stage and the final ranking stage may be a second ranking stage. A third ranking stage that is specialized may be employed in certain embodiments, and is contemplated to be within the scope of the present invention.

As briefly mentioned above, the overall ranking process is employed when a search query is received to pare the quantity of matching documents down to a manageable size. In some embodiments, the search engine may employ a staged process to select search results for a search query, such as the staged approach described in U.S. patent application Ser. No. 12/951,528, entitled "MATCHING FUNNEL FOR LARGE DOCUMENT INDEX."

When a search query is received, the search query is analyzed to identify atoms. The atoms are then used during the various stages of the overall ranking process. These stages may be referred to as the L0 stage (matching stage) to query the search index and identify an initial set of matching documents that contain the atoms, or at least some of the atoms, from the search query. This initial process may reduce the number of candidate documents from all documents indexed in the search index to those documents matching the atoms from the search query. For instance, a search engine may search through millions or even trillions of documents to determine those that are most relevant to a particular search query. Once the L0 matching stage is complete, the number of candidate documents is greatly reduced. Many algorithms for locating the most relevant documents, however, are costly and time-consuming. As such, two or more stages (N stages) may also be employed, including a preliminary ranking stage and a final ranking stage. The preliminary ranking stage often identifies more candidate documents than is cost efficient to analyze in depth using the final ranking stage. When N stages are employed in the overall ranking process, each earlier stage may utilize a subset of features used in the later stage, and may also used features not used in the later stage. As such, each earlier stage is basically an approximation of the ranking provided by the later stage, but that is less expensive and perhaps simplified.

The preliminary ranking stage, also termed the L1 stage, employs a simplified scoring function used to compute a preliminary score or ranking for candidate documents retained from the L0 matching stage described above. The preliminary ranking component 210, as such, is responsible for providing preliminary rankings for each of the candidate documents retained from the L0 matching stage. The preliminary ranking stage is simplified when compared to the final ranking stage as it employs only a subset of the ranking features used by the final ranking stage. For instance, one or more, but likely not all, of the ranking features used in the final ranking stage are employed by the preliminary ranking stage. Additionally, features not employed by the final ranking stage may be employed by the preliminary ranking stage. In embodiments of the present invention, the ranking features used by the preliminary ranking stage do not have atom-interdependencies, such as term closeness and term co-occurrence. For example, the ranking features used in the preliminary ranking stage may include, for exemplary purposes only, static features and dynamic atom-isolated components. Static features, generally, are those components that only look into features that are query-independent. Examples of static features include page rank, spam ratings of a particular web page, etc. Dynamic atom-isolated components are components that only look at features that are related to single atoms at a time. Examples may include, for instance, BM25f, frequency of a certain atom in a document, location (context) of the atom in the document (e.g., title, URL, anchor, header, body, traffic, class, attributes), etc.

Once the number of candidate documents has again been reduced by the preliminary ranking stage, the final ranking stage, also termed the L2 stage, ranks the candidate documents provided to it by the preliminary ranking stage. The algorithm used in conjunction with the final ranking stage is a more expensive operation with a larger number of ranking features when compared to the ranking features used in the preliminary ranking stage. The final ranking algorithm, however, is applied to a much smaller number of candidate documents. The final ranking algorithm provides a set of ranked documents, and search results are provided in response to the original search query based on the set of ranked documents.

Returning to the ranking server 206, the ranking server 206 comprises various components, each of which provides functionality to the process of calculating preliminary rankings to candidate documents and selecting only those documents, through both ranking and pruning, that are relevant to a search query to pass on to a final ranking stage. These components include a preliminary ranking component 210, a final ranking component 212, a feature selection component 214, an algorithm generating component 216, and a data extraction component 218. Components not illustrated in FIG. 2 that may be used to provide preliminary rankings to documents and prune the remaining quantity of documents to a manageable size are also contemplated to be within the scope of the present invention. Further, not all of the components shown in relation to the ranking server 206 may be used, or in some embodiments, may be combined with other components.

The preliminary ranking component 210, as briefly described above, is responsible for ranking a set of candidate documents and therefore decreasing the quantity of candidate documents that are passed on to the final ranking stage, which utilizes the final ranking function 212 to rank the smaller set of candidate documents. For instance, hundreds of millions or even a trillion documents are searched in the L0 matching stage. The number of relevant documents may be pruned to thousands of documents after the preliminary ranking stage, and further pruned to tens of documents after the final ranking stage. These documents may then be presented to the user on a search results page. In some embodiments, the simplified scoring function may serve as an approximation of the final ranking algorithm that will ultimately be used to rank documents. However, the simplified scoring function provides a less expensive operation than the final ranking algorithm allowing for a larger number of candidate documents to be processed quickly. Candidate documents are pruned based on the preliminary score. For instance, only the top N documents having the highest preliminary scores may be retained.

To calculate rankings of documents, the preliminary ranking component 210 utilizes preliminary ranking features, some of which are also used in the final ranking stage. The preliminary scoring operates on, among other things, precomputed scores stored in the search index for document/atom pairs. As mentioned, static features and isolated features, such as dynamic atom-isolated components, may be used by the preliminary ranking component 210. In embodiments, the preliminary ranking component 210 accesses, by way of the data extraction component 218, a search index 220 or other data, such as data stored in the data store 204 to extract data associated with the preliminary features used by the preliminary ranking component 210. In some instances, this data may be stored in the form of precomputed scores. A particular atom, for instance, may have one or more precomputed scores associated therewith in relation to various attributes corresponding to a particular document. For example, a first atom may be repeated 10 times in a particular document, and a second atom may be repeated 55 times in that same document. The second atom may have a higher score than the first atom, as it is found more times in that document. Or, the system may be set up such that an atom found in a title is given a higher score than an atom found only in the URL. Various rules may be incorporated into the preliminary scoring function. As such, precomputed scores are stored in a search index or other data store and this data can be extracted and used in the preliminary scoring function.

In embodiments, although the first-round (L1) features or preliminary ranking features are query independent, the L1 or preliminary ranking function may not be query independent. For example the preliminary ranking function depends on how many atoms there are in a particular query, on whether there are alternate interpretations or spellings, on how certain we are of those factors, on what language and country the query seems to be from, etc. So, while the preliminary ranking function draws heavily on precalculated query-independent features delivered as a summary rank for each atom, the preliminary ranking function may also combine them in a query-dependent manner.

In one embodiment, there is just one precomputed score for each atom/document pair such that the precomputed score for a particular atom takes into account multiple features. For instance, a precomputed score may take into account a frequency of a particular atom in a document, how close the various instances of the atom are to one another, the context of the atom, such as where it is located in the document, etc. In an alternative embodiment, an atom has more than one precomputed score associated with a particular document. For instance, an atom may have a precomputed score that takes into account the frequency of that atom in a document, and another precomputed score for the portions of the document in which the atom is found.

Prior to the preliminary ranking function calculating preliminary scores for the documents, preliminary ranking features are determined. Preliminary ranking features, as previously mentioned, may come from various sources. In one instance, ranking features used by the final ranking component 212 are analyzed. The ranking features used by the final ranking component 212 may generally be divided into three main categories. These categories include, at least, static features, dynamic atom-isolated components, and dynamic atom-correlation components, or those that have atom-interdependencies. The feature selection component 214, in one embodiment, performs the function of dividing the features into these categories. The feature selection component 214 may select those features that are static features or dynamic atom-isolated components as potential preliminary ranking features. These features are even further analyzed, as not all of these features may be selected to be used in the preliminary ranking function. Those features that are ultimately selected may be easy to compute (e.g., easy to use in the preliminary ranking function), useful as determined by a fidelity measurement between the preliminary ranking and the final ranking, and adaptive in terms of how the ranking feature performs when the preliminary ranking function is modified, etc. Further, the selected features may be computed at a low cost compared to other ranking features. While these features may be easy to compute, some may be difficult to compute in real-time when a query is received, and therefore may be used in the preliminary ranking function so that they can be precomputed and stored in a search index as a precomputed score.

In one embodiment, one or more of the preliminary features used in the preliminary ranking function are manually selected. As such, this selection process requires at least some user interaction. Alternatively or in conjunction with the previous embodiment, at least some of the preliminary features are selected automatically, such as by way of a machine-learning tool. In one embodiment, the machine-learning tool may be incorporated into the feature selection component 214. The manual selection and the machine-learning tool may be used in conjunction with one another to select the preliminary features. Or, features may be manually selected and the machine-learning tool may then determine whether those features are helpful or not in calculating document rankings. This machine-learning environment allows for the usefulness of each feature in the preliminary ranking function. If a particular feature is found to not be particularly useful, it may be removed from the preliminary ranking function.

Once the features are selected by the feature selection component 214, the algorithm generating component 216 generates an algorithm that calculates rankings for each document. The algorithm is generated using identified preliminary ranking features, such as those selected as being easy to calculate and useful from the final ranking function. In one embodiment, features that are not necessarily used in the final ranking function but that have proven to be useful in the preliminary ranking function are also used.

To determine how useful a feature is in the preliminary ranking function, some type of fidelity measurement may be used. The fidelity measurement may compare the final ranking and the preliminary ranking associated with a particular document to determine how close the rankings are. In embodiments, the first, or preliminary ranking stage operates as an estimate of the second, or final ranking stage. In the optimal situation, the preliminary ranking would always match the final ranking. This, however, is typically not the case. Fidelity can be measured in many ways, all of which are not described herein, but are contemplated to be within the scope of the present invention. For instance, fidelity may be defined by, for some useful top number (e.g., 10, 100), that the preliminary ranking function will suggest the same elements or documents as would have been found if the final ranking function would have been used to rank all of the same documents ranked by the preliminary function. As such, fidelity may be measured by taking the top ten ranked documents, as ranked by the final ranking function, and determining how many of those documents were ranked in the top ten ranked documents as ranked by the preliminary ranking function. Therefore, if the preliminary ranking function ranks eight of the final ranking function's top ten documents in its top ten, the fidelity may be calculated to be 80% (8/10). The eight of the top ten results produced by the preliminary ranking function may not be in the same order as the top ten results produced by the final ranking function. In some instance, this it taken into consideration in relation to the fidelity ranking, but in other instances it is not.

Similarly, a fidelity measurement may determine how many candidate documents need to be returned from the preliminary ranking calculation so that a sufficient number of results (e.g., candidate documents) are returned as a result of the final ranking calculation. Alternatively, a fidelity measurement may be used to determine a number of candidate documents returned from the preliminary ranking function to be sure the final ranking function is returning all of the preliminary ranking function's top ten results. Yet another way of utilizing a fidelity measurement is to set a threshold, such as 99%. Therefore, for example, a goal can be that 99% of the time, the top ten results returned by the final ranking function are in the top 50 documents returned by the preliminary ranking function. Of course, these numbers can vary and are given for illustrative purposes only.

Embodiments described herein enable agility of the final ranking function without requiring a full rebuild of the precomputed data used for the preliminary ranking stage. By measuring the fidelity between existing preliminary stage computations and a new candidate for a final ranking function, the new pruning thresholds for the preliminary ranking stage may be determined for the desired error range. For instance, 99% of the time, the preliminary ranking stage gets the top ten ranked documents from the final ranking stage in the top 50. A new ranking feature may be determined to increase the accuracy of the final ranking function. Any disagreements between the results of the new final ranking function and the preliminary ranking function may be fine tuned without recomputing the precomputed scores. As long as the preliminary ranking stage has done a good job by the old standard, it is likely to do a good job by the new standard, or the new/updated final ranking function.

Turning now to FIG. 3, a flow diagram is shown of a method 300 for generating an algorithm used to provide preliminary rankings to a plurality of documents. Initially, a final ranking function is analyzed at step 310. The final ranking function, as described above, is used to calculate final rankings for a plurality of documents. In embodiments, the final ranking function is expensive to perform and thus is employed for a limited number of candidate documents, such as those documents returned from the preliminary ranking function. In one embodiment, although the final ranking function is referred to as "final," one or more ranking stages may be employed subsequent to the final ranking stage. It is termed "final" because it is the last staged referred to herein. At step 312, potential preliminary ranking features are identified from the final ranking function. These identified features may include static ranking features that are query independent and dynamic atom-isolated components that are related to only a single atom. Those ranking features that are not identified as potential preliminary ranking features may be those ranking features that are dynamic atom-correlation components that have atom-interdependencies, such as term closeness, term co-occurrence, etc. As mentioned, static ranking features (e.g., page rank, spam ratings) are query-independent ranking features and are those that are not dependent on a query and may be calculated even before a query is received. Dynamic atom-isolated components only take into account those features that are related to single atoms at a time (e.g., frequency, context).

At step 314, preliminary ranking features are selected from the potential preliminary ranking features identified in step 312. The preliminary ranking features are used in the preliminary ranking function to calculate rankings of candidate documents. In one embodiment, the preliminary ranking features include some of the ranking features identified in step 314, but also some features not used in the final ranking function, but that have proven to be useful and accurate in the preliminary ranking function. Further, the preliminary ranking features may be manually identified, thus requiring user interaction (e.g., human engineering). Alternatively or in combination with the above, the preliminary ranking features may be selected with the assistance of a machine-learning tool that evaluates the ease of calculation, usefulness, adaptiveness, etc., of a particular feature and then determines whether that feature should be used in the preliminary ranking function. In one embodiment, a combination of a manual selection and a machine-learning tool are utilized to select preliminary ranking features. As briefly mentioned above, preliminary ranking features are selected based on many factors. These factors may include, for exemplary purposes only, an ease of use of the ranking features in the preliminary ranking function, a usefulness of the ranking features as determined by a fidelity measurement between the preliminary ranking and the final ranking of the documents, an adaptiveness of the ranking features when the preliminary ranking function is modified, a cost of computing the feature, or the like. In some instances, although preliminary ranking features are easy to compute, they may also be difficult to compute in real-time once a query is received, and thus may be used for the preliminary rankings because they can be precomputed, eliminating the need for their computation in real-time. A combination of these factors may be considered. At step 316, an algorithm is generated from the preliminary ranking features to calculate preliminary rankings of documents. Once the rankings are assigned to each of the documents, the top-ranked documents (e.g., top 100, top 1000, top 2000) are sent to the final ranking function for final rankings. The top-ranked documents from the final ranking function are those that may be presented to the user in response to the user's search query.

In one embodiment, a search query is received from a user. The algorithm generated at step 316 for the preliminary ranking function is used to algorithmically identify a subset of the documents that are most relevant to the search query. These candidate documents are communicated (e.g., by way of document identification) to a final ranking stage so that a final ranking function can assign a final ranking to the candidate documents and determine those that are most relevant to the search query. These results are presented to the user.

FIG. 4 is a flow diagram showing a method 400 for calculating a preliminary ranking for documents. Initially, static ranking features are identified at step 410. Static ranking features are those that are query-independent and in some instance, may not be related to a search query at all. For instance, static features may include page rank, spam ratings, language of the page, etc. At step 412, dynamic atom-isolated components are identified. Dynamic atom-isolated components are ranking features that are related to single atoms at a time and how the atoms appear in the context of a particular document such that the precomputed score can be assigned to atom/document pairs ahead of receiving a search query and can be stored in, for instance, a search index. In one embodiment, the static features and dynamic atom-isolated components are at least partially identified from a final ranking function such that the preliminary ranking function is basically a simplified form of the final ranking function. Features not used by the final ranking function may also be used for the preliminary ranking function.

A set of preliminary ranking features are selected at step 414. These preliminary ranking features may be static ranking features and/or dynamic atom-isolated components. For a first document, data corresponding to the set of preliminary ranking features is extracted at step 416. The data may be extracted from a search index, for example. Further, extracted data may include precomputed scores for the set of preliminary ranking features in association with a plurality of documents. Precomputed scores may be for specific atom/document pairs such that the precomputed score takes into account various features, or precomputed scores may be for an atom/document pair but for a particular feature, such as how many times that atom appears in a particular document. The precomputed scores may be stored in a search index. Based on a search query, the extracted data is utilized at step 418 to calculate a preliminary ranking of the first document. For instance, as previously described, a preliminary ranking function may utilize an algorithm used to calculate preliminary rankings of documents.

In one embodiment, once preliminary rankings have been calculated for the candidate documents, the top N highest-ranked documents can be identified and sent on to the final ranking stage, wherein N can be any number and may vary. For instance, it may be determined whether a relevance, as determined by a preliminary ranking, of a first document exceeds a threshold. Based on the relevance of the first document exceeding the threshold, a document identification of the first document may be sent to a final ranking stage that assigns the first document with a final ranking. As mentioned, the final ranking stage utilizes, in addition to the static features and dynamic atom-isolated components, dynamic atom-correlation components that are query-dependent in determining the final ranking of documents. Dynamic atom-correlation components may be a frequency of a particular atom in a document or a contextual location of a particular atom in a document. Contextual locations include, for instance, a title, anchor, header, body, traffic class, attributes, and uniform resource locator (URL) of a document.

Figure 5:
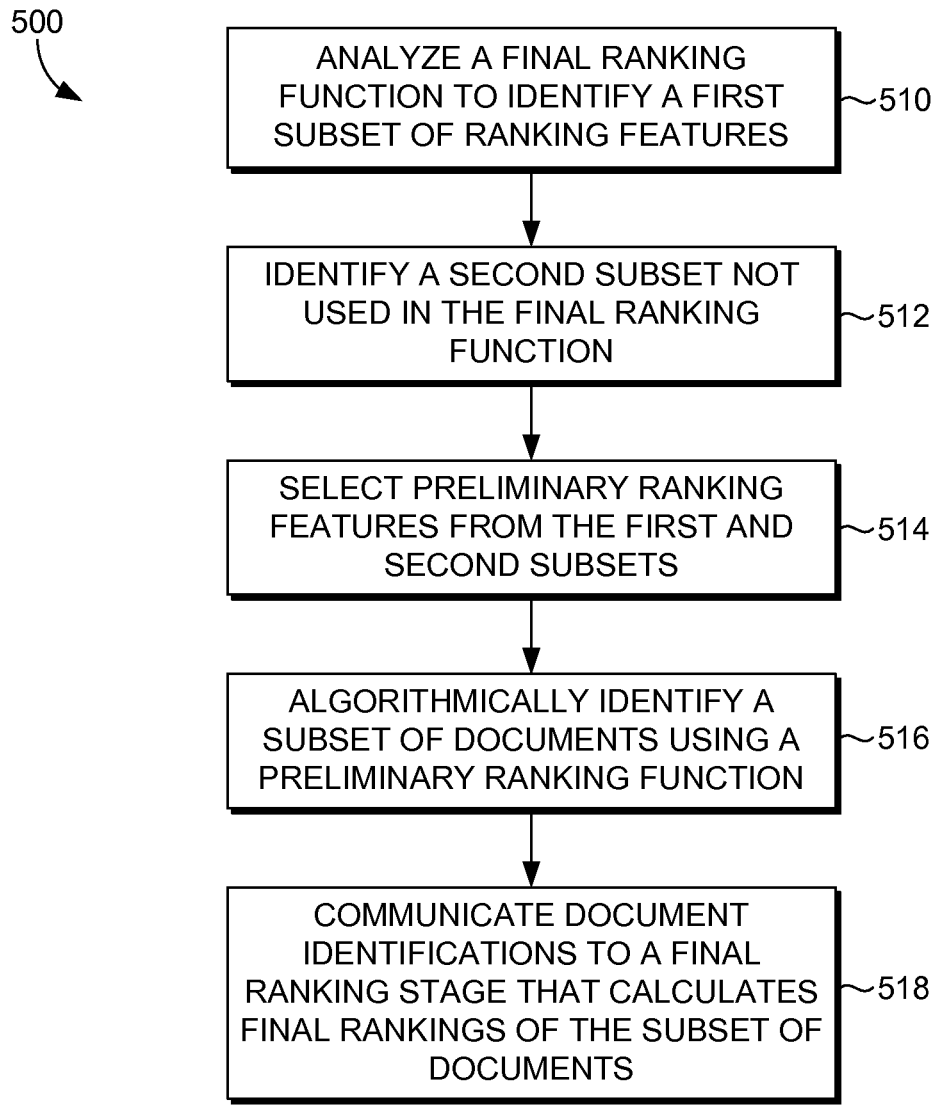
FIG. 5 is a flow diagram showing a method for utilizing ranking features from a final ranking stage in a preliminary ranking stage to determine preliminary rankings for documents, in accordance with embodiments of the present invention.

Referring to FIG. 5, a flow diagram illustrates a method 500 for utilizing ranking features from a final ranking stage in a preliminary ranking stage to determine preliminary rankings for documents. At step 510, a final ranking function is analyzed. A first subset of ranking features is identified, and includes query-independent ranking features and single atom ranking features. At step 512, a second subset of ranking features is selected. These ranking features are not used in the final ranking function. At step 514, preliminary ranking features are selected from the first and second subsets of ranking features. These selected preliminary ranking features are used in calculating a preliminary ranking of documents using a preliminary ranking function that limits a quantity of documents that are ultimately ranked using the final ranking function. A subset of documents is algorithmically identified at step 516 based on the preliminary ranking function. The preliminary ranking function utilizes data associated with the first and second subsets of ranking features, such as precomputed scores of atom/document pairs, including scores related to a query-independent ranking feature (e.g., static feature) in association with a particular document. The data may be extracted from a search index, such as a forward index (e.g., indexed by document identification) or a reverse index (e.g., indexed by atom).

Document identifications corresponding to the subset of documents resulting from the preliminary ranking stage are communicated at step 518 to a final ranking stage that calculates final rankings for the subset of documents such that the top-ranked documents from the final ranking stage are presented to a user based on the user's search query. In embodiments, fidelity metrics are calculated between the preliminary rankings and final rankings for a group of documents to determine the accuracy of the preliminary ranking stage, which is generally a simplified version of the final ranking stage. Fidelity measurements are described in more detail above.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. A method for generating a set of rules used to provide preliminary rankings to documents, the method comprising:
    analyzing a final ranking function used to calculate final rankings for a plurality of documents;
    from the final ranking function, identifying potential preliminary ranking features that include one or more static ranking features that are query independent and one or more dynamic atom-isolated components that are related to a single atom, wherein the preliminary ranking features are identified from the ranking function prior to receiving search queries;
    selecting from the potential preliminary ranking features one or more preliminary ranking features to use for a preliminary ranking function; and
    using at least the one or more preliminary ranking features to generate a set of rules that is used to provide a preliminary ranking for the plurality of documents prior to receiving search queries.

2. The method of claim 1, wherein the one or more preliminary ranking features are manually selected thus requiring user interaction.

3. The method of claim 1, wherein the one or more preliminary ranking features are selected at least partially by a machine-learning tool.

4. The method of claim 1, wherein the one or more preliminary ranking features are selected based on one or more of,
    (1) an ease of use of the ranking feature for the preliminary ranking function,
    (2) a usefulness of the ranking feature as determined by a fidelity measurement between the preliminary ranking and the final ranking of the plurality of documents,
    (3) an adaptiveness of the ranking feature when the preliminary ranking function is modified, or
    (4) a low cost of computing the ranking feature in comparison to other ranking features.

5. The method of claim 1, wherein the preliminary ranking function identifies a subset of the plurality of documents that are sent to the final ranking function for final rankings.

6. The method of claim 1, further comprising:
    receiving a search query;
    utilizing the set of rules, algorithmically identifying a subset of the plurality of documents that are most relevant to the search query; and
    communicating document identifications associated with the subset of the plurality of documents to the final ranking function for final ranking.

7. The method of claim 6, wherein utilizing the set of rules algorithmically identifying a subset of the plurality of documents that are most relevant to the search query further comprises:
    for each document in the plurality of documents, extracting data corresponding to the set of preliminary ranking features from a search index; and
    based on the search query, utilizing the extracted data to calculate a preliminary ranking of the first document, wherein the preliminary ranking determines the relevance of the first document.

8. The method of claim 1, wherein the set of rules that provide the preliminary ranking uses one or more ranking features that are not used in the final ranking function.

9. A system for generating a set of rules used to provide preliminary rankings to documents, the system comprising:
    a ranking server configured for:
    analyzing a final ranking function used to calculate final rankings for a plurality of documents;
    from the final ranking function, identifying potential preliminary ranking features that include one or more static ranking features that are query independent and one or more dynamic atom-isolated components that are related to a single atom, wherein the preliminary ranking features are identified from the ranking function prior to receiving search queries;
    selecting from the potential preliminary ranking features one or more preliminary ranking features to use for a preliminary ranking function;
    using at least the one or more preliminary ranking features, generating a set of rules that is used to provide a preliminary ranking for the plurality of documents prior to receiving search queries, wherein providing a preliminary ranking comprises:
    utilizing the set of rules to identify a subset of the plurality of documents; and communicating document identifications associated with the subset of the plurality of documents to the final ranking function for final ranking.

10. The system of claim 9, further comprising a search index configured for:
    storing data corresponding to the preliminary ranking features from a search index;
    providing precomputed scores for the preliminary ranking features, wherein the precomputed scores are stored in the search index.

11. The system of claim 9, wherein the one or more preliminary ranking features are selected based on one or more of,
    (1) an ease of use of the ranking feature for the preliminary ranking function,
    (2) a usefulness of the ranking feature as determined by a fidelity measurement between the preliminary ranking and the final ranking of the plurality of documents,
    (3) an adaptiveness of the ranking feature when the preliminary ranking function is modified, or
    (4) a low cost of computing the ranking feature in comparison to other ranking features.

12. The system of claim 9, wherein utilizing the set of rules algorithmically identifying a subset of the plurality of documents further comprises:
    receiving a search query;
    for each document in the plurality of documents, extracting data corresponding to the set of preliminary ranking features from a search index; and
    based on the search query, utilizing the extracted data to calculate a preliminary ranking of the first document, wherein the preliminary ranking determines the relevance of the first document.

13. The system of claim 9, wherein the ranking server is further configured for:
    based on the preliminary rankings of other documents, determining that a relevance of a first document exceeds a threshold; and
    based on the relevance of the first document exceeding the threshold, sending an identification of the first document to a final ranking stage that assigns the first document with a final ranking.

14. The system of claim 13, wherein the final raking stage utilizes dynamic atom-correlation components to determine the final ranking of the first document.

15. One or more computer storage memory storing computer-useable instructions that, when used by a computing device, cause the computing device to perform a method for generating a set of rules used to provide preliminary rankings to documents, the method comprising:
    analyzing a final ranking function used to calculate final rankings for a plurality of documents;
    from the final ranking function, identifying potential preliminary ranking features that include one or more static ranking features that are query independent and one or more dynamic atom-isolated components that are related to a single atom, wherein the preliminary ranking features are identified from the ranking function prior to receiving search queries;
    selecting from the potential preliminary ranking features one or more preliminary ranking features to use for a preliminary ranking function; and
    using at least the one or more preliminary ranking features, generating a set of rules that are used to provide a preliminary ranking for the plurality of documents prior to receiving search queries, wherein providing a preliminary ranking comprises:
    utilizing the set of rules to identify a subset of the plurality of documents; and
    communicating document identifications associated with the subset of the plurality of documents to the final ranking function for final ranking.

16. The method of claim 15, wherein the one or more preliminary ranking features are selected based on one or more of,
    (1) an ease of use of the ranking feature for the preliminary ranking function,
    (2) a usefulness of the ranking feature as determined by a fidelity measurement between the preliminary ranking and the final ranking of the plurality of documents,
    (3) an adaptiveness of the ranking feature when the preliminary ranking function is modified, or
    (4) a low cost of computing the ranking feature in comparison to other ranking features.

17. The method of claim 15, wherein the one or more preliminary ranking features are manually selected thus requiring user interaction.

18. The method of claim 15, wherein the one or more preliminary ranking features are selected at least partially by a machine-learning tool.

19. The method of claim 15, wherein the set of rules that provide the preliminary ranking uses one or more ranking features that are not used in the final ranking function.

20. The method of claim 15, wherein utilizing the set of rules to identify a subset of the plurality of documents further comprises:
    receiving a search query;
    for each document in the plurality of documents, extracting data corresponding to the set of preliminary ranking features from a search index; and
    based on the search query, utilizing the extracted data to calculate a preliminary ranking of the first document, wherein the preliminary ranking determines the relevance of the first document.

* * * * *